May 10, 1927.
H. J. HABER
1,628,401
APPARATUS FOR CLEARING OIL WELLS OF PARAFFIN DEPOSITS
Filed July 15, 1922
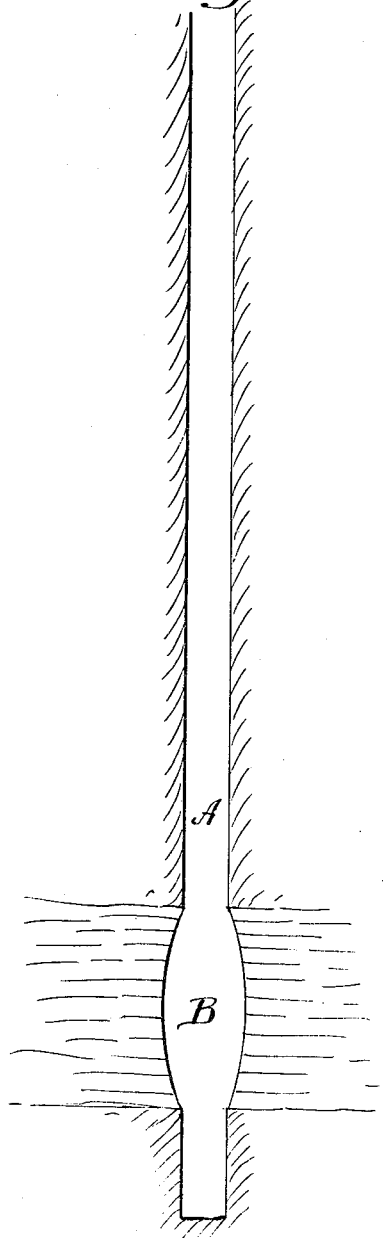
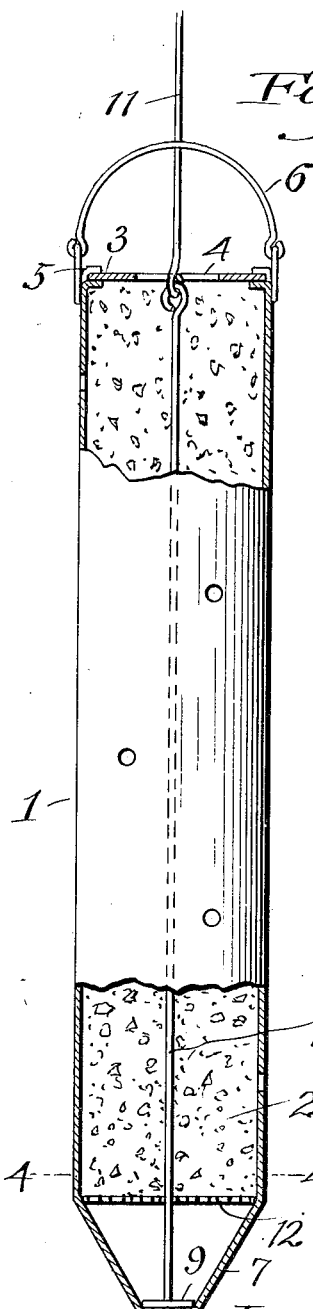
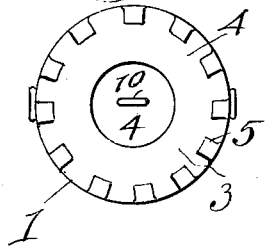
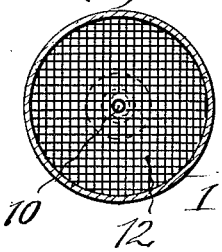
Inventor:
Henry J. Haber,
by
Thurston Kwis & Hudson
attys.

Patented May 10, 1927.

1,628,401

UNITED STATES PATENT OFFICE.

HENRY J. HABER, OF CLEVELAND, OHIO.

APPARATUS FOR CLEARING OIL WELLS OF PARAFFIN DEPOSITS.

Application filed July 15, 1922. Serial No. 575,313.

This invention relates to the treatment of oil wells to reestablish a free flow of oil. After an oil well has been producing for some time the flow of oil gradually becomes less and less due to deposits of paraffin in the oil bearing sands surrounding the bottom portion of the well.

It is an object of this invention to provide an inexpensive and efficient means for periodically treating oil wells to maintain a free flow of oil.

More specifically, it is an object of this invention to provide means for generating intense heat at the bottom of the well to melt down the paraffin clog.

A further object of the invention is to provide a heat generating cartridge capable of producing intense heat under high pressure directly on the oil bearing sands surrounding the lower portion of the well, whereby the congealed or hardened paraffin obstructing the oil flow is melted and can be later removed from the well.

A further object is to provide a heat generating cartridge composed of substances which will react exothermically upon the addition of water to evolve the desired heat.

Other objects will be apparent from the following description and annexed drawings.

Reference should be had to the annexed drawing forming a part of this specification, in which Fig. 1 is a diagrammatic sectional view showing the lower portion of an oil well; Fig. 2 is a broken side view of the heat generating cartridge or bomb partially in elevation and partially in central vertical section; Fig. 3 is a top plan view of the cartridge; Fig. 4 is a section on the line 4—4 of Fig. 2.

Referring to the accompanying drawings, the heat generating cartridge comprises a casing or shell 1 which is filled with a chemical in the form of an endothermic mixture or compound. The shell is composed of a substance with which the chemical will react exothermically upon the addition of water. The material composing the shell is nonmagnetic preferably of aluminum because of its physical properties of lightness and strength, while the chemical contained in the tube is preferably a hydrate of an alkali metal such as caustic soda or caustic potash, either of which will upon the addition of water react exothermically with the aluminum shell. The material within the shell may be a pure hydrate or a mixture of an alkali hydrate and some catalytic agent. In some cases powdered aluminum may be mixed with the hydrate in the shell. The shell 1 is cylindrical in shape and has a cover disk 3 at its upper end which has a central aperture 4 and is held in place by tongues 5 struck up from the end of the casing 1. The shell 1 may also have small perforations in the body thereof to permit entry of water to the chemicals contained therein. A bail 6 is attached to the upper end of the casing 1 and is adapted to be attached to a suitable hoisting cable for lowering the bomb into the well. The casing 1 has a conical pointed lower end 7 with a central aperture 8 which is normally closed by a valve 9 secured to the end of the rod 10 which extends axially of the casing. The upper end of the rod 10 is connected to a trip-line 11 by means of which the valve 9 can be lifted to allow water to enter the lower end of the casing. A foraminous disk 12 fits within the cylindrical portion of the casing 1 and is seated upon the upper end of the tapered portion 7. The alkali hydrate is packed in the casing 1 above the foraminous disk 12 which serves to provide a clear space in the pointed end of the casing within which the valve 9 can be shifted to permit water to enter through the inlet opening 8.

When the heat generating cartridge above described is used for heating an oil well, a suitable hoist line is connected to the bail 6 and the cartridge is lowered in the well to the depth necessary to position it within the oil bearing strata.

The presence of a body of magnetic ore adjacent the walls of the well often makes it difficult to lower metal of magnetic properties into a well. Since the cartridge contains no metal parts capable of being magnetized, the lowering of the cartridge into the well will not be interfere with in the passage through beds of magnetic ore. When the cartridge has been lowered to proper position, the valve 9 is lifted by means of the trip-line 11 to admit water into the lower end of the casing. Water is generally present in sufficient quantities in the well to provide the necessary reaction between the substances composing the charge. Whenever necessary or desirable, however, water may be introduced into the well so that it will enter the cartridge through the opening 4 in the top thereof.

The exothermic reaction between the water, alkali hydrate, catalytic agent and container generates intense heat causing the formation of steam and other gases or vapors which are forced under high pressure into the oil bearing strata surrounding the well A, causing the oil bearing strata to be broken up adjacent the well forming an enlarged portion B and penetrating the oil bearing strata for a considerable distance on all sides of the enlarged portion B, melting down deposits of paraffin and forming unobstructed passages leading to the portion B of the well through the oil bearing strata on all sides thereof. The sludge in the bottom of the well containing the melted paraffin can then be removed and a greatly increased flow of oil obtained.

Having described my invention, I claim—

1. A cartridge for heating the bottom of oil wells, comprising a hydrate of an alkali metal and a container therefor formed of a metal with which the hydrate has an exothermic reaction.

2. A cartridge for heating the bottom of oil wells, comprising an aluminum shell filled with a hydrate of an alkali metal.

3. A cartridge for heating the bottom of oil wells, comprising a shell filled with a mixture composed of a hydrate of an alkali metal and aluminum, said shell having an aperture through which water may pass to the interior thereof.

4. A cartridge for heating the bottom of oil wells, comprising an aluminum shell having a tapered lower end with an aperture therein, a valve in said aperture, and means for opening said valve, said shell being filled with a hydrate of an alkali metal.

5. A cartridge for heating the bottom of oil wells, comprising a metallic shell having a cylindrical body portion and a tapered lower end portion with an aperture therein, a foraminous disk at the bottom of said cylindrical portion, a valve closing said aperture, a rod extending axially of said shell and connected to said valve, and a trip-line connected to said rod.

6. A cartridge for heating the bottom of oil wells, comprising an aluminum shell having a valve controlled aperture at its lower end and an apertured upper end, said shell being filled with a hydrate of an alkali metal.

7. A cartridge for heating the bottom of oil wells, comprising an outer shell, and a filler, said shell and filler being composed of substances which react exothermically upon addition of water, said shell being formed to permit entry of water to the interior thereof.

8. A cartridge for heating the bottom of oil wells, comprising an outer shell having apertures for admission of water to the interior thereof and a filler of material which will react exothermically with the material of the shell upon the addition of water.

In testimony whereof, I hereunto affix my signature.

HENRY J. HABER.